(12) United States Patent
Presna

(10) Patent No.: US 12,071,039 B1
(45) Date of Patent: Aug. 27, 2024

(54) VEHICULAR BATTERY TRAY AND CABINET

(71) Applicant: Pierre-Richard Presna, Bridgeport, CT (US)

(72) Inventor: Pierre-Richard Presna, Bridgeport, CT (US)

( * ) Notice: Subject to any disclaimer, the term of this patent is extended or adjusted under 35 U.S.C. 154(b) by 427 days.

(21) Appl. No.: 17/241,234

(22) Filed: Apr. 27, 2021

(51) Int. Cl.
*B60L 58/19* (2019.01)
*B60L 50/60* (2019.01)
*B60L 50/64* (2019.01)

(52) U.S. Cl.
CPC ............. *B60L 58/19* (2019.02); *B60L 50/64* (2019.02); *B60L 50/66* (2019.02)

(58) Field of Classification Search
CPC .......... B60L 58/19; B60L 50/64; B60L 50/66
See application file for complete search history.

(56) References Cited

U.S. PATENT DOCUMENTS

| | | | |
|---|---|---|---|
| 2007/0188130 A1* | 8/2007 | Scheucher | |
| 2008/0213652 A1* | 9/2008 | Scheucher | |
| 2017/0021739 A1* | 1/2017 | Tsuji | |
| 2022/0239136 A1* | 7/2022 | Fasching | |

FOREIGN PATENT DOCUMENTS

| | | | | |
|---|---|---|---|---|
| CN | 109466303 A | * | 3/2019 | ............... B60K 1/04 |
| DE | 102020004026 A1 | * | 8/2020 | |

* cited by examiner

*Primary Examiner* — James A Shriver, II
*Assistant Examiner* — Nicholas R. Kandas
(74) *Attorney, Agent, or Firm* — Kyle A. Fletcher, Esq.

(57) ABSTRACT

The vehicular battery tray and cabinet is an energy storage device. The vehicular battery tray and cabinet stores chemical potential energy. The vehicular battery tray and cabinet converts the stored chemical potential energy into electric energy used to power an electric load. The vehicular battery tray and cabinet is a rechargeable and hot swappable structure. By rechargeable structure is meant that the chemical potential energy can be renewed. By hot swappable is meant that the components of the vehicular battery tray and cabinet can be replaced as electric energy is flowing into and out of the vehicular battery tray and cabinet. The vehicular battery tray and cabinet incorporates a plurality of battery trays, a monitor circuit, and an external power source. The plurality of battery trays, the monitor circuit, and the external power source are electrically interconnected.

14 Claims, 7 Drawing Sheets

VEHICULAR BATTERY TRAY AND CABINET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and the distribution of electric power, more specifically, a circuit arrangement for a hot pluggable dc electric power distribution system. (H02J1/001)

SUMMARY OF INVENTION

The vehicular battery tray and cabinet is an energy storage device. The vehicular battery tray and cabinet stores chemical potential energy. The vehicular battery tray and cabinet converts the stored chemical potential energy into electric energy used to power an electric load. The vehicular battery tray and cabinet is a rechargeable structure. By rechargeable structure is meant that the chemical potential energy stored by the vehicular battery tray and cabinet can be renewed by reversing the polarity of the vehicular battery tray and cabinet. The vehicular battery tray and cabinet is a modular structure. By modular structure is meant that the components of the vehicular battery tray and cabinet can be interchanged are replaceable. The vehicular battery tray and cabinet is hot swappable. By hot swappable is meant that the components of the vehicular battery tray and cabinet can be replaced as electric energy is flowing into and out of the vehicular battery tray and cabinet. The vehicular battery tray and cabinet comprises a plurality of battery trays, a monitor circuit, and an external power source. The plurality of battery trays, the monitor circuit, and the external power source are electrically interconnected.

These together with additional objects, features and advantages of the vehicular battery tray and cabinet will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular battery tray and cabinet in detail, it is to be understood that the vehicular battery tray and cabinet is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular battery tray and cabinet.

It is therefore important that the claims be regarded as including such equivalent construction insofar as they do not depart from the spirit and scope of the vehicular battery tray and cabinet. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
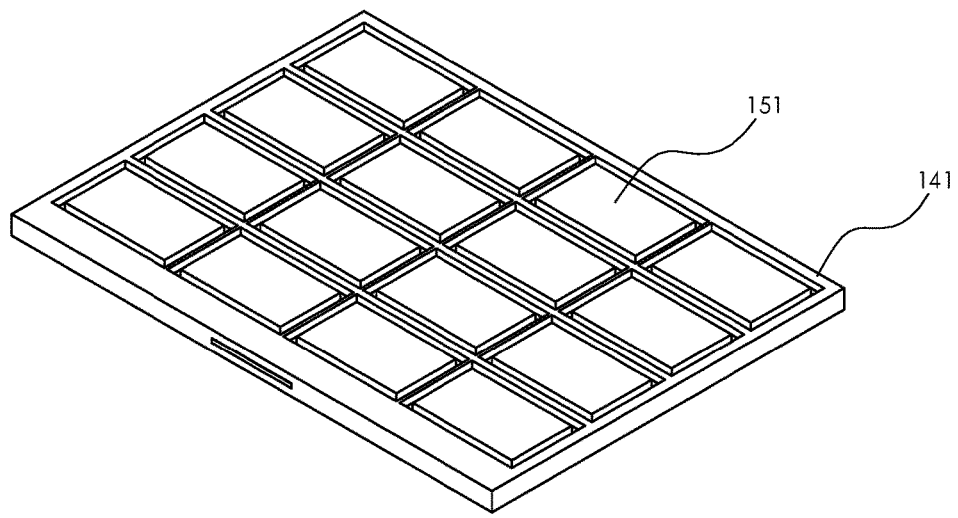
FIG. 1 is a perspective view of an embodiment of the disclosure.
Figure 2:
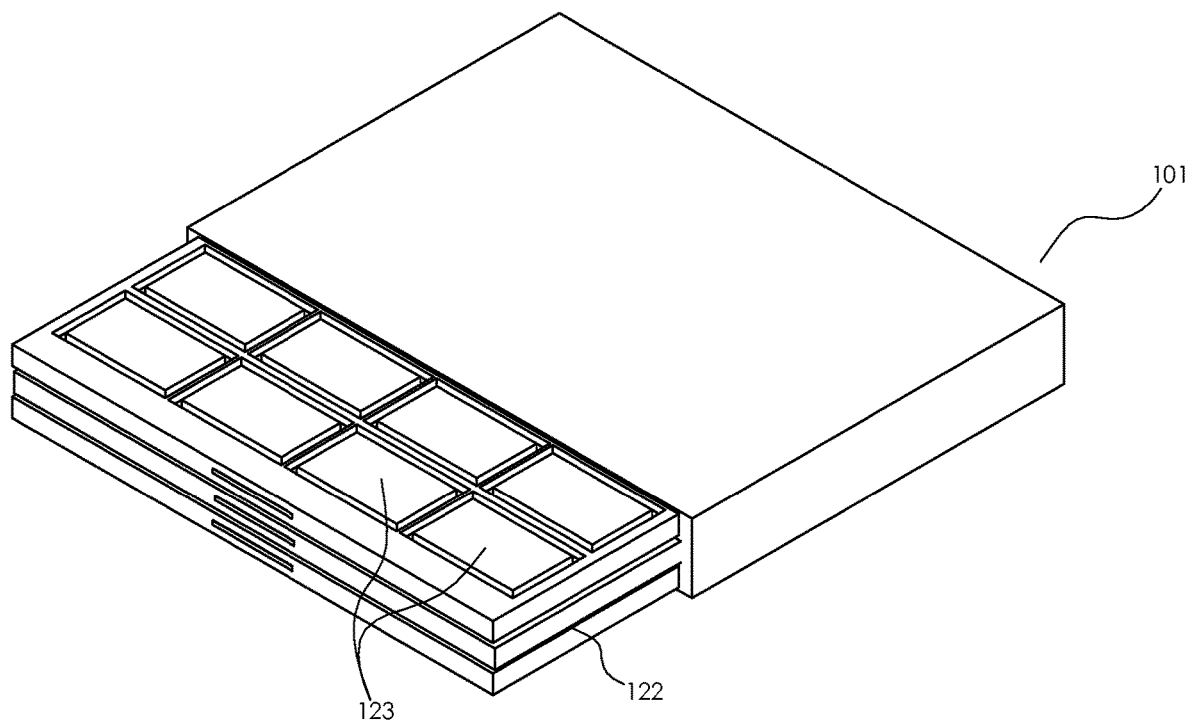
FIG. 2 is a perspective view of an embodiment of the disclosure.
Figure 3:
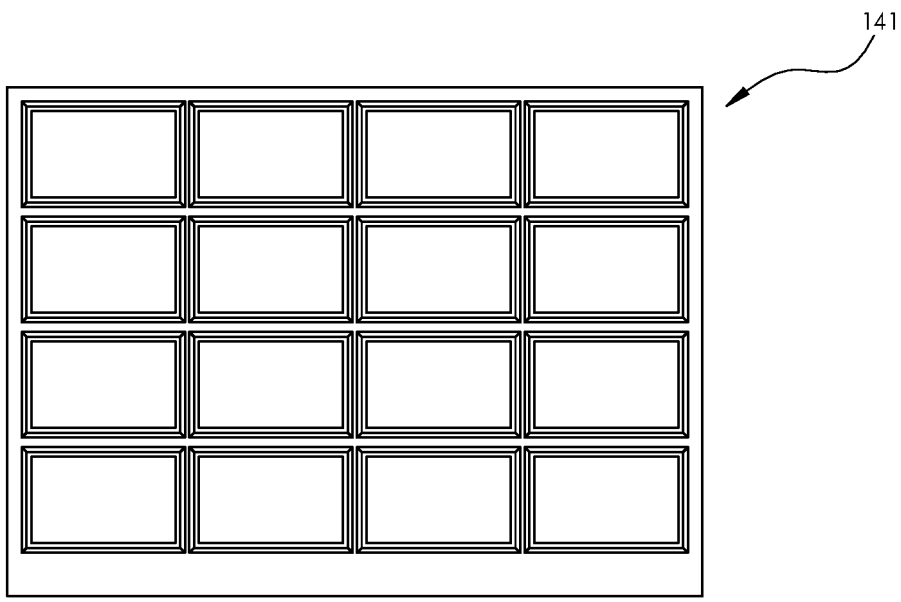
FIG. 3 is a top view of an embodiment of the disclosure.
Figure 4:
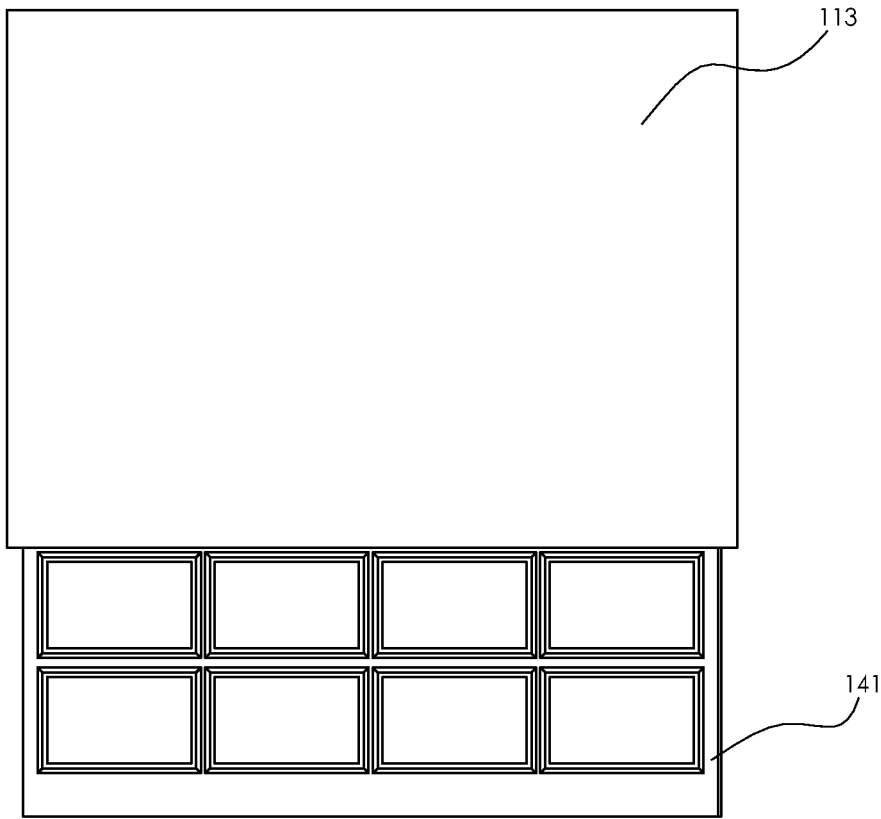
FIG. 4 is a top view of an embodiment of the disclosure.
Figure 5:
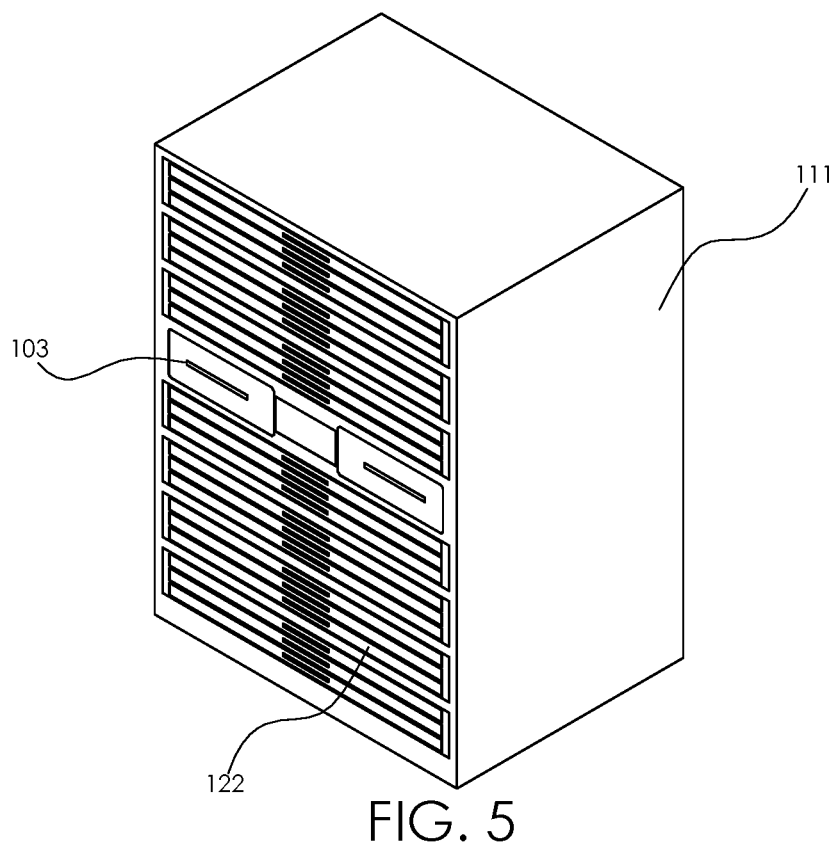
FIG. 5 is a perspective view of an embodiment of the disclosure.
Figure 6:
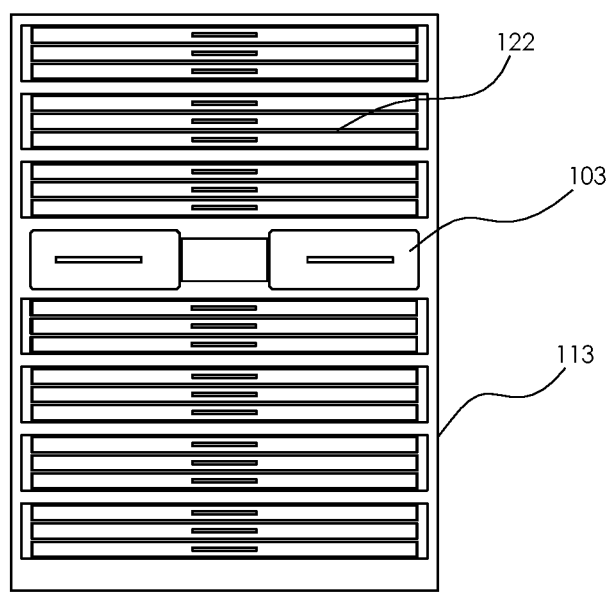
FIG. 6 is a front view of an embodiment of the disclosure.
Figure 7:
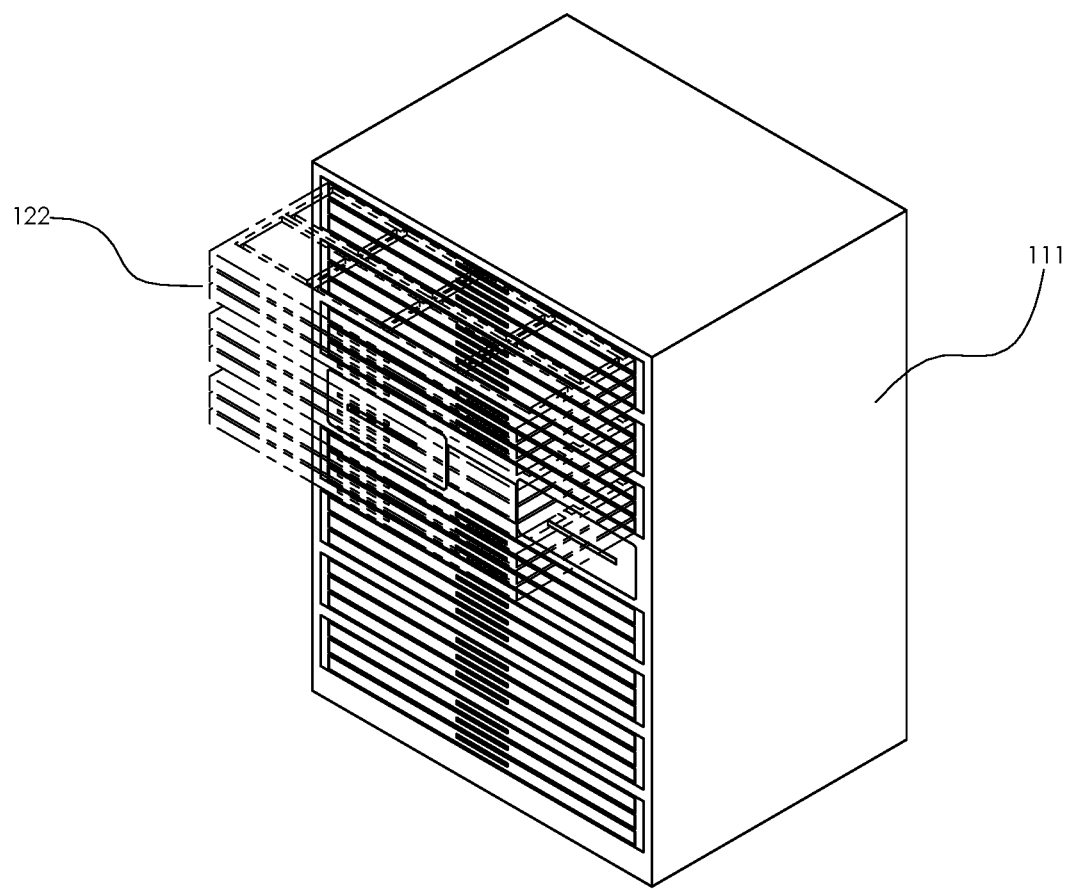
FIG. 7 is a perspective view of an embodiment of the disclosure.
Figure 8:
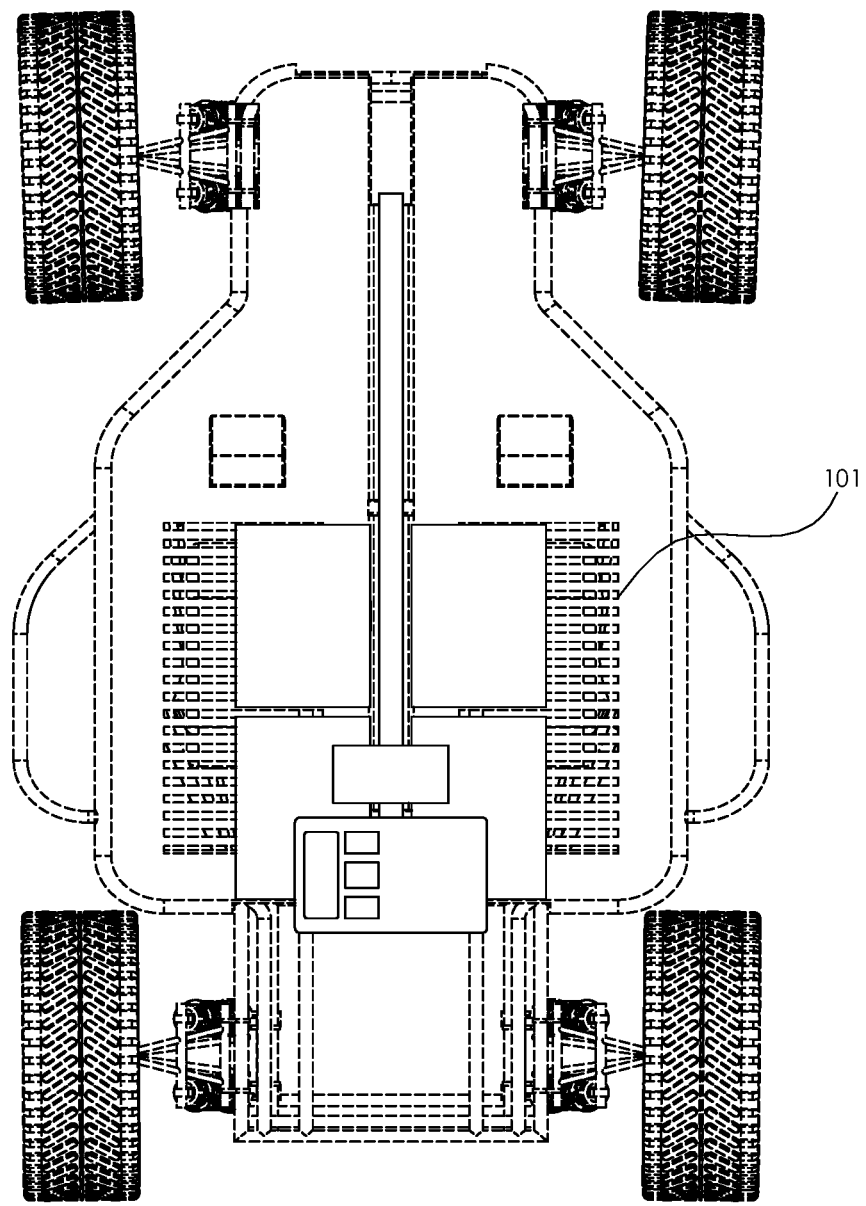
FIG. 8 is an in-use view of an embodiment of the disclosure.
Figure 9:
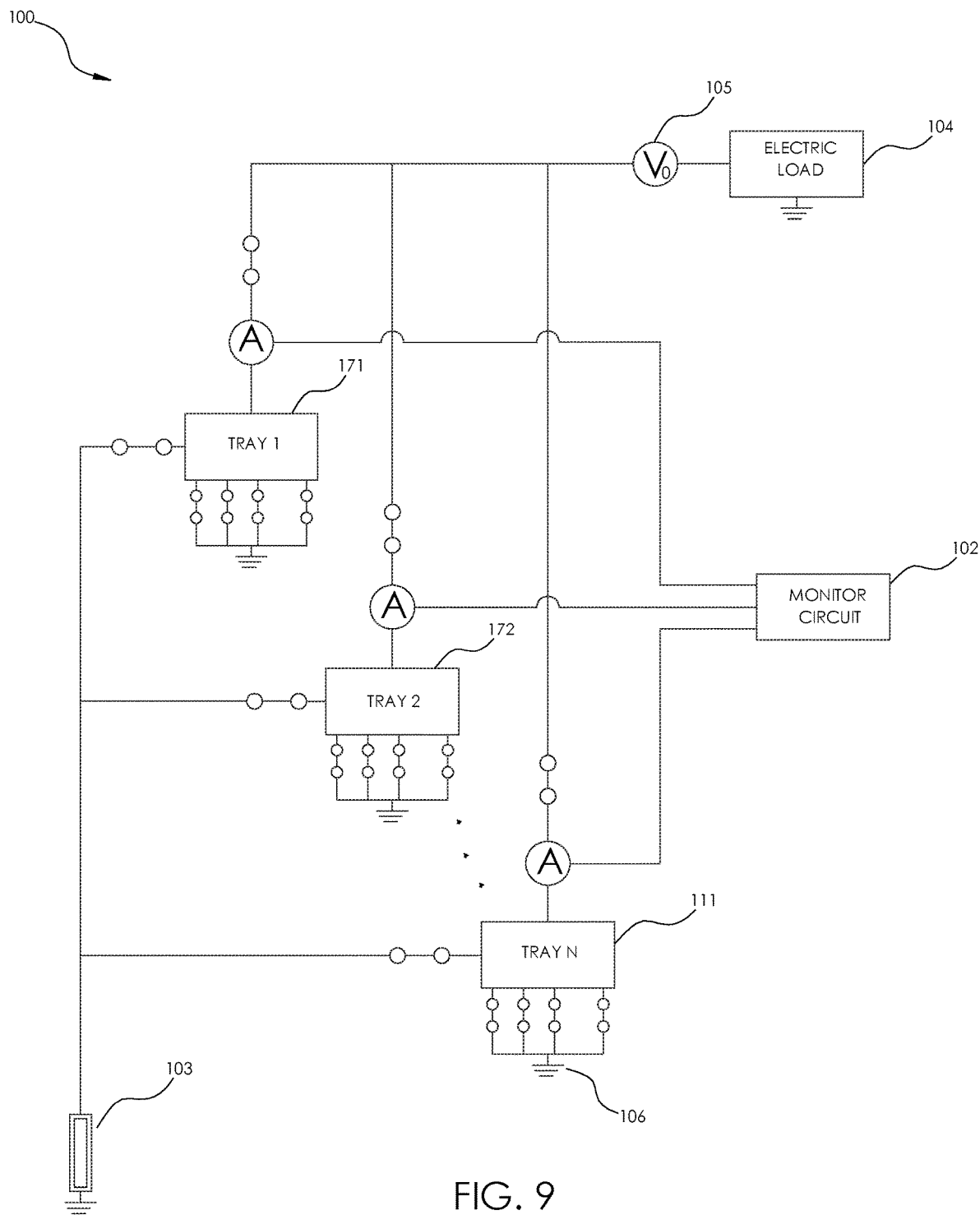
FIG. 9 is a schematic view of an embodiment of the disclosure.
Figure 10:
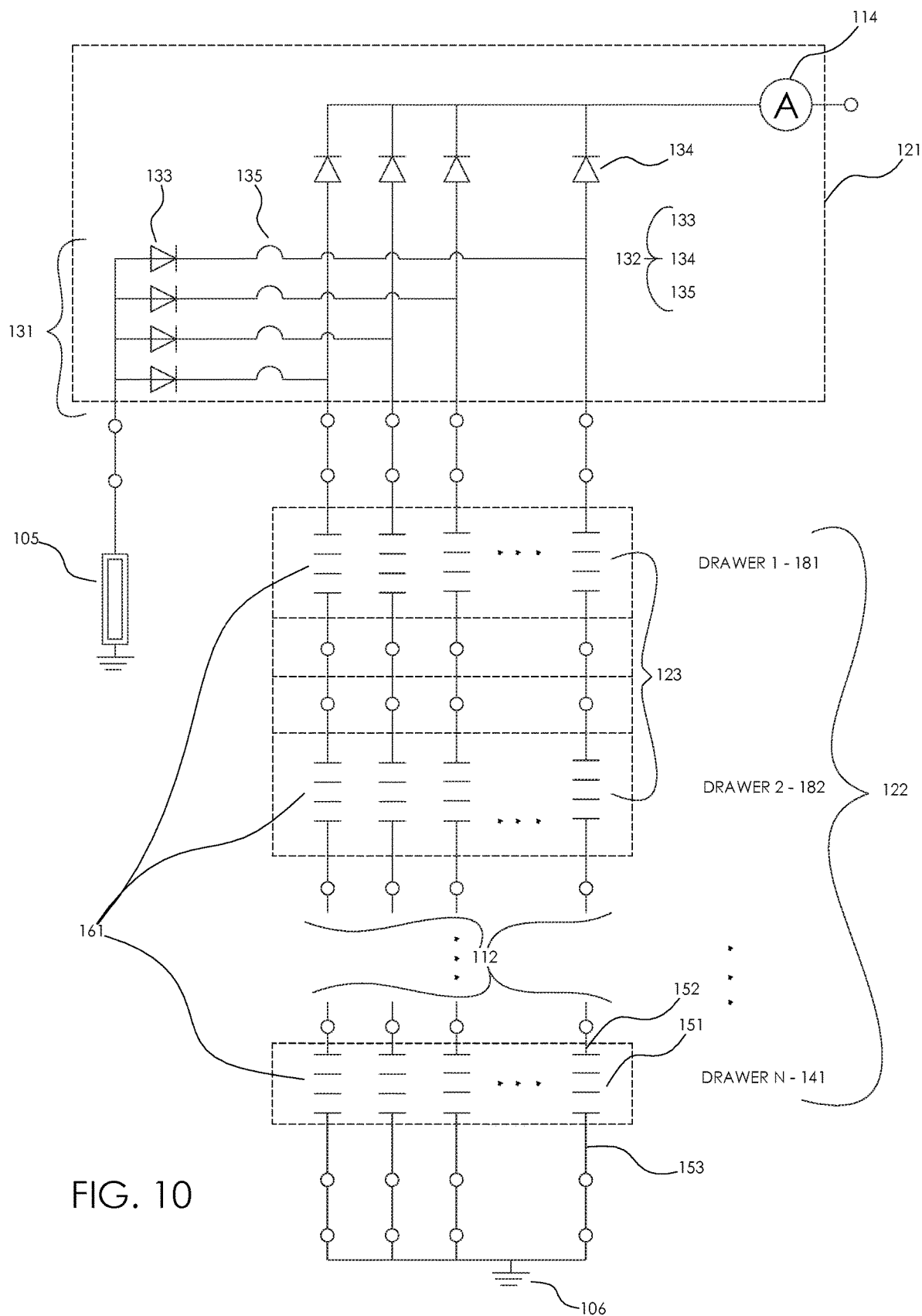
FIG. 10 is a schematic view of an embodiment of the disclosure.

Detailed reference will now be made to one or more potential embodiments of the disclosure, which are illustrated in FIGS. 1 through 10.

The vehicular battery tray and cabinet 100 (hereinafter invention) is an energy storage device. The invention 100 stores chemical potential energy. The invention 100 converts the stored chemical potential energy into electric energy used to power an electric load 104. The invention 100 is a rechargeable structure. By rechargeable structure is meant that the chemical potential energy stored by the invention 100 can be renewed by reversing the polarity of the invention 100. The invention 100 is a modular structure. By modular structure is meant that the components of the invention 100 can be interchanged are replaceable. The invention 100 is hot swappable. By hot swappable is meant that the components of the invention 100 can be replaced as electric energy is flowing into and out of the invention 100. The invention 100 comprises a plurality of battery trays 101, a monitor circuit 102, and an external power source 103. The plurality of battery trays 101, the monitor circuit 102, and the external power source 103 are electrically interconnected.

The invention 100 provides dc electric energy to an electric load 104. The invention 100 further comprises a master voltage output 105 and an electric ground 106. The electric load 104 is a device that requires electric energy for operation. This disclosure assumes that the electric load 104 is a vehicle. The master voltage output 105 is the electric potential generated by the plurality of battery trays 101. The master voltage output 105 provides the dc electric energy consumed by the electric load 104. The electric ground 106 is defined elsewhere in this disclosure.

The monitor circuit 102 is an electric circuit. The monitor circuit 102 monitors the battery tray 111 voltage output of each individual battery tray 111 selected from the plurality of battery trays 101. The monitor circuit 102 generates an alarm when the monitor circuit 102 detects anomalies in the battery tray 111 voltage output 114 of any individual battery tray 111. The monitor circuit 102 shuts down any or all of the plurality of battery trays 101 when a dangerous operating condition is detected.

The external power source 103 is an externally provided source of dc electric energy. The external power source 103 provides the dc electric energy necessary to reverse the polarity of each individual battery tray 111 selected from the plurality of battery trays 101 in order to replenish the chemical potential energy. This disclosure assumes that the external power source 103 is the generator (alternator) of the electric system of a vehicle.

The plurality of battery trays 101 forms the energy storage and distribution structure of the invention 100. Each of the plurality of battery trays 101 is identical. Each of the plurality of battery trays 101 stores chemical potential energy. Each of the plurality of battery trays 101 converts the chemical potential energy into electric energy. Each of the plurality of battery trays 101 transmits the converted electric energy to the electric load 104. Each of the plurality of battery trays 101 draws electric energy from the external power source 103. Each of the plurality of battery trays 101 converts the drawn electric energy back into chemical potential energy. The plurality of battery trays 101 are wired in a parallel circuit.

The plurality of battery trays 101 comprises a first individual battery tray 171 and a second individual battery tray 172. The first individual battery tray 171 is an individual battery tray 111 selected from the plurality of battery trays 101. The second individual battery tray 172 is an individual battery tray 111 selected from the plurality of battery trays 101. The invention 100 requires the use of at least two individual battery trays 111 in the plurality of battery trays 101.

The plurality of battery trays 101 comprises a collection of individual battery trays 111.

The individual battery tray 111 is an energy storage and distribution structure. Each of the individual battery tray 111 is identical. Each of the individual battery tray 111 stores chemical potential energy. Each of the individual battery tray 111 converts the chemical potential energy into electric energy. Each of the individual battery tray 111 transmits the converted electric energy to the electric load 104. Each of the individual battery tray 111 draws electric energy from the external power source 103. Each of the individual battery tray 111 converts the drawn electric energy back into chemical potential energy.

Each individual battery tray 111 is an interchangeable structure. Each individual battery tray 111 is hot swappable. Any first individual battery tray 171 selected from the plurality of battery trays 101 operates independently from any second individual battery tray 172 selected from the plurality of battery trays 101. By independent is meant that the performance and operation of the first individual battery tray 171 does not depend on the performance and operation of the second individual battery tray 172. Each of the individual battery trays 111 are isolated from each other. By isolated is meant that electric energy does not flow from any first individual battery tray 171 selected from the plurality of battery trays 101 into any second individual battery tray 172 selected from the plurality of battery trays 101.

Each individual battery tray 111 comprises a battery tray 111 cabinet 113, a master isolation circuit 121, a plurality of battery cell storage drawers 122, and a plurality of battery cells 123.

The battery tray 111 cabinet 113 is a housing. The battery tray 111 cabinet 113 is a rigid structure. The battery tray 111 cabinet 113 contains the master isolation circuit 121, the plurality of battery cell storage drawers 122, and the plurality of battery cells 123. The battery tray 111 cabinet 113 is formed with all apertures and form factors necessary to allow the battery tray 111 cabinet 113 to accommodate the use and operation of the invention 100. Methods to form a battery tray 111 cabinet 113 suitable for the purposes described in this disclosure are well-known and documented in the mechanical arts.

The master isolation circuit 121 is an electric circuit. The master isolation circuit 121 isolated each of the plurality of battery stacks 112. By isolating each of the plurality of battery stacks 112 is meant that the master isolation circuit 121 prevents the flow of electric energy between any two individual battery stacks 161 selected from the plurality of battery stacks 112. By isolating each of the plurality of battery stacks 112 is further meant that the master isolation circuit 121 prevents the flow of electric energy from any individual battery stack 161 selected from the plurality of battery stacks 112 into the external power source 103. By isolating each of the plurality of battery stacks 112 is further meant that the master isolation circuit 121 prevents the flow of electric energy from any second individual battery tray 111 selected from the plurality of battery trays 101 into any individual battery stack 161 selected from the plurality of battery stacks 112. The master isolation circuit 121 comprises a plurality of battery stack 161 isolation circuits 131.

Each of the plurality of battery stack 161 isolation circuits 131 is an electric circuit. Each of the plurality of battery stack 161 isolation circuits 131 prevents the flow of electric energy between any two batteries stacks selected from the plurality of battery stacks 112. Each of the plurality of battery stack 161 isolation circuits 131 prevents the flow of electric energy from any battery stacks selected from the plurality of battery stacks 112 into the external power source 103. There is a one to one correspondence between the plurality of battery stack 161 isolation circuits 131 and the plurality of battery stacks 112. Each plurality of battery stack 161 isolation circuits 131 selected from the plurality of battery stack 161 isolation circuits 131 protects a battery stack selected from the plurality of battery stacks 112. The plurality of battery stack 161 isolation circuits 131 comprises a collection of individual battery stack 161 isolation circuits 132.

Each individual battery stack 161 isolation circuit 132 prevents the flow of electric energy from its associated individual battery stack 161 into another individual battery stack 161. Each individual battery stack 161 isolation circuit 132 prevents the flow of electric energy from its associated individual battery stack 161 into the external power source 103. Each individual battery stack 161 isolation circuit 132 prevents the flow of electric energy from the master voltage output 105 into its associated individual battery stack 161. The individual battery stack 161 isolation circuit 132 comprises an external power source 103 isolation diode 133, an output isolation diode 134, and a thermal circuit breaker 135.

The external power source 103 isolation diode 133 is a diode. The external power source 103 isolation diode 133 electrically connects between the external power source 103 and the individual battery stack 161 associated with the individual battery stack 161 isolation circuit 132 such that electric energy will not flow from the individual battery stack 161 into the external power source 103.

The output isolation diode 134 is a diode. The output isolation diode 134 electrically connects between the master voltage output 105 and the individual battery stack 161 associated with the individual battery stack 161 isolation circuit 132 such that electric energy will not flow from the master voltage output 105 into the individual battery stack 161.

The thermal circuit breaker 135 is a thermally actuated circuit breaker. The thermal circuit breaker 135 electrically disconnects the external power source 103 from the individual battery stack 161 associated with the individual battery stack 161 isolation circuit 132 when the temperature of the individual battery stack 161 exceeds a previously determined temperature Each of the plurality of battery cell storage drawers 122 is a mechanical structure. Each of the plurality of battery cell storage drawers 122 is an interchangeable structure. Each of the plurality of battery cell storage drawers 122 is a hot swappable. Each of the plurality of battery cell storage drawers 122 are identical. Each of the plurality of battery cell storage drawers 122 inserts into the battery tray 111 cabinet 113. Each of the plurality of battery cell storage drawers 122 stores a subset of the plurality of battery cells 123 contained in the individual battery tray 111. The is a one to one correspondence between the battery cells contained in any first individual battery drawer 181 selected from the plurality of battery cell storage drawers 122 and any second individual battery drawer 182 selected from the plurality of battery cell storage drawers 122.

The plurality of battery cell storage drawers 122 comprises a first individual battery drawer 181 and a second individual battery drawer 182. The first individual battery drawer 181 is an individual battery cell storage drawer 141 selected from the plurality of battery cell storage drawers 122. The second individual battery drawer 182 is an individual battery cell storage drawer 141 selected from the plurality of battery cell storage drawers 122. The invention 100 requires the use of at least two individual battery cell storage drawers 141 in the plurality of battery cell storage drawers 122. The plurality of battery cell storage drawers 122 comprises a collection of individual battery cell 151 storage drawers 141.

The individual battery cell storage drawer 141 is a storage drawer selected from the plurality of battery cell storage drawers 122. Each individual battery cell storage drawer 141 is identical. Each individual battery cell storage drawer 141 is a modular structure. The individual battery cell storage drawer 141 contains a subset of battery cells selected from the plurality of battery cells 123.

The individual battery cell storage drawer 141 inserts into the battery tray 111 cabinet 113 such that the subset of battery cells contained in the individual battery cell storage drawer 141 form the electrical connections required to incorporate the subset of battery cells into the plurality of battery stacks 112 of the individual battery tray 111. The individual battery cell storage drawer 141 and the associated subset of battery cells forms a hot swappable structure. The is a one to one correspondence between the subset of battery cells contained in any first individual battery drawer 181 selected from the plurality of battery cell storage drawers 122 and the subset of battery cells contained in any second individual battery drawer 182 selected from the plurality of battery cell storage drawers 122.

Each of the plurality of battery cells 123 is an electrochemical structure. Each of the plurality of battery cells 123 is identical. Each of the plurality of battery cells 123 is a battery that: a) stores chemical potential energy; and, b) converts the chemical potential energy into electric energy. Each of the plurality of battery cells 123 is a rechargeable battery. The plurality of battery cells 123 comprises a collection of individual battery cells 151.

The individual battery cell 151 is a self-contained electrochemical structure known as a battery. Each individual battery cell 151 selected from the plurality of battery cells 123 mounts in an individual battery cell storage drawer 141 selected from the plurality of battery cell storage drawers 122. Each individual battery cell 151 further comprises a positive terminal 152 and a negative terminal 153.

The positive terminal 152 is the cathode of the individual battery cell 151 when the individual battery cell 151 is discharging. The negative terminal 153 is the anode of the individual battery cell 151 when the individual battery cell 151 is discharging.

The individual battery tray 111 forms a plurality of battery stacks 112 to generate a battery tray 111 voltage output 114. Each of the plurality of battery stacks 112 is an electrochemical structure. The plurality of battery stacks 112 is an energy storage and distribution structure. Each of the plurality of battery stacks 112 is identical. Each of the plurality of battery stacks 112 stores chemical potential energy. Each of the plurality of battery stacks 112 converts the chemical potential energy into electric energy. Each of the plurality of battery stacks 112 transmits the converted electric energy to the electric load 104. Each of the plurality of battery stacks 112 draws electric energy from the external power source 103. Each of the plurality of battery stacks 112 converts the drawn electric energy back into chemical potential energy. Each of the plurality of battery stacks 112 are isolated from each other. By isolated is meant that electric energy does not flow between any two individual battery stacks 161 selected from the plurality of battery stacks 112.

The plurality of battery stacks 112 comprises a collection of individual battery stacks 161. The individual battery stack 161 is a battery stack selected from the plurality of battery stacks 112.

Each individual battery stack 161 is formed from the series electrical connection between the battery cell selected from the first individual battery drawer 181 selected from the plurality of battery cell storage drawers 122 and the corresponding battery cells selected from each of the other individual battery cell 151 storage drawers 141 contained in the plurality of battery cell storage drawers 122. Specifically, the individual battery stack 161 is formed by electrically connecting the negative terminal 153 of the individual battery cell 151 of a corresponding battery cell to the positive terminal 152 of an adjacent corresponding individual battery cell 151.

The positive terminal 152 of the resulting individual battery stack 161 provides a portion of the electric energy provisioned through the battery tray 111 voltage output 114. The negative terminal 153 of the resulting individual battery stack 161 electrically connects to the electric ground 106.

The following definitions were used in this disclosure:

AC: As used in this disclosure, AC is an acronym for alternating current.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a chemical device consisting of one or more cells, in which chemical energy is converted into electricity and used as a source of power. Batteries are commonly defined with a positive terminal and a negative terminal.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Circuit Breaker: As used in this disclosure, a circuit breaker is a normally closed maintained switch that automatically actuates to an open position should a dangerous condition (such as overcurrent or ground fault) be detected.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Drawer: As used in this disclosure, a drawer is a box or pan that is designed to slide into and out of a larger object.

Electric Circuit: As used in this disclosure, an electric circuit is a closed loop path through which electrons flow. The closed loop will generally initiate and terminate at an electrical power source.

Electric Current: As used in this disclosure, an electric current refers to the net movement of electrons past a point in an electric circuit: Electric current is often referred to a current. Electric current is measured in Amperes (Amps) and has the units of coulombs per second.

Electrical Ground: As used in this disclosure, an electrical ground is a common reference voltage that is used in the design and implementation of electrical circuits. An electrical ground is often, but not necessarily, the discharge point of electric currents flowing through an electric circuit.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Generator: In this disclosure, a generator is a machine that converts rotational mechanical energy into electric energy. A generator typically comprises a stator and a rotor. The stator is a stationary hollow cylindrical structure that forms a magnetic field. The rotor is a rotating cylindrical structure that is coaxially mounted in the stator. The rotation of the rotor within the stator physically generates the electrical energy. A generator can generated an electrical voltage selected from the group consisting of an AC voltage and a DC voltage. When a DC voltage is generated, this disclosure assumes that the term generator includes commutator and electrical circuitry required to generate a regulated DC voltage.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Housing: As used in this disclosure, a housing is a rigid structure that encloses and protects one or more devices.

Independent: As used in this disclosure, the term independent refers to the relationship between the operation and control of a first device and a second device. The first device and the second device are independent from each other if: a) the operation of the first device is neither impacted nor influenced by the operation of the second device; and, b) the operation of the second device is neither impacted nor influenced by the operation of the first device.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Modular: As used in this disclosure, modular refers to a system of assembly of a structure from modules.

Module: As used in this disclosure, a module refers to an independent subunit of a larger structure. Modules are often interchangeable in a manner that allows the form factor or function of the larger structure to be customized. Interchangeable: As used in this disclosure, interchangeable refers to the ability to remove and replace an element of a structure. For example, if a first object that is attached to a structure can be removed and replaced with a second object selected from a plurality of compatible objects then the first object is said to be replaceable with both: 1) the second object; and, 2) each of the elements of compatible objects. Term interchangeable is commonly associated with tools. Interchangeable objects are often used to change the function or the performance characteristics of a tool.

Motor: As used in this disclosure, a motor refers to the method of transferring energy from an external power source into mechanical energy.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Parallel Circuit: As used in this disclosure, a parallel circuit refers to a method of electrically connecting a plurality of circuit elements to a voltage source. In a parallel circuit each circuit element receives a voltage equal to the full voltage produced by the voltage source.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Short Circuit: As used in this disclosure, a short circuit refers to an electrical connection that bypasses a load within an electric circuit. The short circuit can be deliberately inserted into the electric circuit or can be the result of a failure within the electric circuit. A short circuit is often referred to as a short.

Stack: As used in this disclosure, a stack refers to a collection of disk-shaped objects that are stored such that each of the disk-shaped objects are aligned.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Terminal: As used in this disclosure, a terminal is the end point of a conductor. A terminal can be the conducting wire itself or may have attached to is a device designed to facilitate an electrical connection. The terminal is also called a termination.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy.

Volt: As used in this disclosure, a volt refers to the difference in electrical potential energy between two points in an electric circuit. A volt is measured as joules per coulomb. The term voltage refers to a quantitative measure of the volts between the two points.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicular battery tray and cabinet comprising
   wherein the vehicular battery tray and cabinet comprises a plurality of battery trays, a monitor circuit, and an external power source;
   wherein the plurality of battery trays, the monitor circuit, and the external power source are electrically interconnected;
   wherein the vehicular battery tray and cabinet is hot swappable;
   wherein by hot swappable is meant that the components of the vehicular battery tray and cabinet can be replaced as electric energy is flowing into and out of the vehicular battery tray and cabinet;
   wherein the plurality of battery trays comprises a collection of individual battery trays;
   wherein each individual battery tray comprises a battery tray cabinet, a master isolation circuit, a plurality of battery cell storage drawers, and a plurality of battery cells;
   wherein each of the plurality of battery cell storage drawers slide in or out of the cabinet, and act independent of one another;
   wherein the master isolation circuit comprises a plurality of battery stack isolation circuits;
   wherein each of the plurality of battery stack isolation circuits is an electric circuit;
   wherein each of the plurality of battery stack isolation circuits prevents the flow of electric energy between any two batteries stacks selected from the plurality of battery stacks;
   wherein each of the plurality of battery stack isolation circuits prevents the flow of electric energy from any battery stacks selected from the plurality of battery stacks into the external power source;
   wherein there is a one to one correspondence between the subset of battery cells contained in any first individual battery drawer selected from the plurality of battery cell storage drawers and the subset of battery cells contained in any second individual battery drawer selected from the plurality of battery cell storage drawers.

2. The vehicular battery tray and cabinet according to claim 1
   wherein the vehicular battery tray and cabinet is an energy storage device;
   wherein the vehicular battery tray and cabinet stores chemical potential energy;
   wherein the vehicular battery tray and cabinet converts the stored chemical potential energy into electric energy used to power an electric load;
   wherein the vehicular battery tray and cabinet is a rechargeable structure;
   wherein by rechargeable structure is meant that the chemical potential energy stored by the vehicular battery tray and cabinet can be renewed by reversing the polarity of the vehicular battery tray and cabinet;
   wherein the vehicular battery tray and cabinet is a modular structure;
   wherein by modular structure is meant that the components of the vehicular battery tray and cabinet can be interchanged and are replaceable.

3. The vehicular battery tray and cabinet according to claim 2
   wherein the vehicular battery tray and cabinet provides dc electric energy to an electric load;
   wherein the vehicular battery tray and cabinet further comprises a master voltage output and an electric ground;
   wherein the electric load is a device that requires electric energy for operation;
   wherein the master voltage output is the electric potential generated by the plurality of battery trays.

4. The vehicular battery tray and cabinet according to claim 3
   wherein the monitor circuit is an electric circuit;
   wherein the monitor circuit monitors the battery tray voltage output of each individual battery tray selected from the plurality of battery trays;
   wherein the monitor circuit generates an alarm when the monitor circuit detects anomalies in the battery tray voltage output of any individual battery tray.

5. The vehicular battery tray and cabinet according to claim 4 wherein the external power source is an externally provided source of dc electric energy;
wherein the external power source provides the dc electric energy necessary to reverse the polarity of each individual battery tray selected from the plurality of battery.

6. The vehicular battery tray and cabinet according to claim 5
wherein each of the plurality of battery trays is identical;
wherein each of the plurality of battery trays stores chemical potential energy;
wherein each of the plurality of battery trays converts the chemical potential energy into electric energy;
wherein each of the plurality of battery trays transmits the converted electric energy to the electric load;
wherein each of the plurality of battery trays draws electric energy from the external power source;
wherein each of the plurality of battery trays converts the drawn electric energy back into chemical potential energy;
wherein the plurality of battery trays are wired in a parallel circuit;
wherein the plurality of battery trays comprises a first individual battery tray and a second individual battery tray;
wherein the first individual battery tray is an individual battery tray selected from the plurality of battery trays;
wherein the second individual battery tray is an individual battery tray selected from the plurality of battery trays;
wherein the vehicular battery tray and cabinet requires the use of at least two individual battery trays in the plurality of battery trays.

7. The vehicular battery tray and cabinet according to claim 6
wherein the individual battery tray is an energy storage and distribution structure;
wherein each of the individual battery tray is identical;
wherein each of the individual battery tray stores chemical potential energy;
wherein each of the individual battery tray converts the chemical potential energy into electric energy;
wherein each of the individual battery tray transmits the converted electric energy to the electric load;
wherein each of the individual battery tray draws electric energy from the external power source;
wherein each of the individual battery tray converts the drawn electric energy back into chemical potential energy;
wherein each individual battery tray is an interchangeable structure;
wherein each individual battery tray is hot swappable;
wherein any first individual battery tray selected from the plurality of battery trays operates independently from any second individual battery tray selected from the plurality of battery trays;
wherein by independent is meant that the performance and operation of the first individual battery tray does not depend on the performance and operation of the second individual battery tray;
wherein each of the individual battery trays are isolated from each other;
wherein by isolated is meant that electric energy does not flow from any first individual battery tray selected from the plurality of battery trays into any second individual battery tray selected from the plurality of battery trays.

8. The vehicular battery tray and cabinet according to claim 7
wherein the battery tray cabinet is a housing;
wherein the battery tray cabinet is a rigid structure;
wherein the battery tray cabinet contains the master isolation circuit, the plurality of battery cell storage drawers, and the plurality of battery cells;
wherein the master isolation circuit is an electric circuit;
wherein the master isolation circuit isolated each of the plurality of battery stacks;
wherein by isolating each of the plurality of battery stacks is meant that the master isolation circuit prevents the flow of electric energy between any two individual battery stacks selected from the plurality of battery stacks;
wherein by isolating each of the plurality of battery stacks is further meant that the master isolation circuit prevents the flow of electric energy from any individual battery stack selected from the plurality of battery stacks into the external power source;
wherein by isolating each of the plurality of battery stacks is further meant that the master isolation circuit prevents the flow of electric energy from any second individual battery tray selected from the plurality of battery trays into any individual battery stack selected from the plurality of battery stacks.

9. The vehicular battery tray and cabinet according to claim 8
wherein each of the plurality of battery stack isolation circuits is an electric circuit;
wherein there is a one to one correspondence between the plurality of battery stack isolation circuits and the plurality of battery stacks;
wherein each plurality of battery stack isolation circuits selected from the plurality of battery stack isolation circuits protects a battery stack selected from the plurality of battery stacks;
wherein the plurality of battery stack isolation circuits comprises a collection of individual battery stack isolation circuits;
wherein each individual battery stack isolation circuit prevents the flow of electric energy from its associated individual battery stack into another individual battery stack;
wherein each individual battery stack isolation circuit prevents the flow of electric energy from its associated individual battery stack into the external power source;
wherein each individual battery stack isolation circuit prevents the flow of electric energy from the master voltage output into its associated individual battery stack.

10. The vehicular battery tray and cabinet according to claim 9
wherein each of the plurality of battery cell storage drawers is a mechanical structure;
wherein each of the plurality of battery cell storage drawers is an interchangeable structure;
wherein each of the plurality of battery cell storage drawers is a hot swappable;
wherein each of the plurality of battery cell storage drawers are identical;
wherein each of the plurality of battery cell storage drawers inserts into the battery tray cabinet;
wherein each of the plurality of battery cell storage drawers stores a subset of the plurality of battery cells contained in the individual battery tray;
wherein there is a one to one correspondence between the battery cells contained in any first individual battery drawer selected from the plurality of battery cell storage drawers and any second individual battery drawer selected from the plurality of battery cell storage drawers;

wherein the plurality of battery cell storage drawers comprises a first individual battery drawer and a second individual battery drawer;

wherein the first individual battery drawer is an individual battery cell storage drawer selected from the plurality of battery cell storage drawers;

wherein the second individual battery drawer is an individual battery cell storage drawer selected from the plurality of battery cell storage drawers;

wherein the vehicular battery tray and cabinet requires the use of at least two individual battery cell storage drawers in the plurality of battery cell storage drawers;

wherein each of the plurality of battery cells is an electrochemical structure;

wherein each of the plurality of battery cells is identical;

wherein each of the plurality of battery cells is a battery that: a) stores chemical potential energy; and, b) converts the chemical potential energy into electric energy;

wherein each of the plurality of battery cells is a rechargeable battery.

11. The vehicular battery tray and cabinet according to claim 10 wherein the individual battery stack isolation circuit comprises an external power source isolation diode, an output isolation diode, and a thermal circuit breaker;

wherein the external power source isolation diode is a diode;

wherein the external power source isolation diode electrically connects between the external power source and the individual battery stack associated with the individual battery stack isolation circuit such that electric energy will not flow from the individual battery stack into the external power source;

wherein the output isolation diode is a diode;

wherein the output isolation diode electrically connects between the master voltage output and the individual battery stack associated with the individual battery stack isolation circuit such that electric energy will not flow from the master voltage output into the individual battery stack;

wherein the thermal circuit breaker is a thermally actuated circuit breaker;

wherein the thermal circuit breaker electrically disconnects the external power source from the individual battery stack associated with the individual battery stack isolation circuit when the temperature of the individual battery stack exceeds a previously determined temperature.

12. The vehicular battery tray and cabinet according to claim 11 wherein the plurality of battery cell storage drawers comprises a collection of individual battery cell storage drawers;

wherein the individual battery cell storage drawer is a storage drawer selected from the plurality of battery cell storage drawers;

wherein each individual battery cell storage drawer is identical;

wherein each individual battery cell storage drawer is a modular structure;

wherein the individual battery cell storage drawer contains a subset of battery cells selected from the plurality of battery cells;

wherein the individual battery cell storage drawer inserts into the battery tray cabinet such that the subset of battery cells contained in the individual battery cell storage drawer form the electrical connections required to incorporate the subset of battery cells into the plurality of battery stacks of the individual battery tray;

wherein the individual battery cell storage drawer and the associated subset of battery cells forms a hot swappable structure;

wherein the plurality of battery cells comprises a collection of individual battery cells;

wherein the individual battery cell is a self-contained electrochemical structure known as a battery;

wherein each individual battery cell selected from the plurality of battery cells mounts in an individual battery cell storage drawer selected from the plurality of battery cell storage drawers;

wherein each individual battery cell further comprises a positive terminal and a negative terminal;

wherein the positive terminal is the cathode of the individual battery cell when the individual battery cell is discharging;

wherein the negative terminal is the anode of the individual battery cell when the individual battery cell is discharging.

13. The vehicular battery tray and cabinet according to claim 12 wherein the individual battery tray forms a plurality of battery stacks to generate a battery tray voltage output;

wherein each of the plurality of battery stacks is an electrochemical structure;

wherein the plurality of battery stacks is an energy storage and distribution structure;

wherein each of the plurality of battery stacks is identical;

wherein each of the plurality of battery stacks stores chemical potential energy;

wherein each of the plurality of battery stacks converts the chemical potential energy into electric energy;

wherein each of the plurality of battery stacks transmits the converted electric energy to the electric load;

wherein each of the plurality of battery stacks draws electric energy from the external power source;

wherein each of the plurality of battery stacks converts the drawn electric energy back into chemical potential energy;

wherein each of the plurality of battery stacks are isolated from each other;

wherein by isolated is meant that electric energy does not flow between any two individual battery stacks selected from the plurality of battery stacks.

14. The vehicular battery tray and cabinet according to claim 13 wherein the plurality of battery stacks comprises a collection of individual battery stacks;

wherein the individual battery stack is a battery stack selected from the plurality of battery stacks;

wherein each individual battery stack is formed from the series electrical connection between the battery cell selected from the first individual battery drawer selected from the plurality of battery cell storage drawers and the corresponding battery cells selected from each of the other individual battery cell storage drawers contained in the plurality of battery cell storage drawers;

wherein the individual battery stack is formed by electrically connecting the negative terminal of the individual battery cell of a corresponding battery cell to the positive terminal of an adjacent corresponding individual battery cell;

wherein the positive terminal of the resulting individual battery stack provides a portion of the electric energy provisioned through the battery tray voltage output;

wherein the negative terminal of the resulting individual battery stack electrically connects to the electric ground.

\* \* \* \* \*